United States Patent [19]
Davies

[11] 3,870,041
[45] Mar. 11, 1975

[54] SURGICAL DRESSINGS

[75] Inventor: Graham Leighton Davies, London, England

[73] Assignee: BTR Industries Limited, London, England

[22] Filed: Aug. 16, 1973

[21] Appl. No.: 388,779

[52] U.S. Cl. .............................................. 128/156
[51] Int. Cl. ........................................... A61f 13/02
[58] Field of Search ............................ 128/156, 268

[56] References Cited
UNITED STATES PATENTS

| | | | |
|---|---|---|---|
| 2,992,644 | 7/1961 | Plantinga et al. | 128/156 |
| 3,416,525 | 12/1968 | Yeremian | 128/156 |
| 3,731,683 | 5/1973 | Zaffaroni | 128/156 |

FOREIGN PATENTS OR APPLICATIONS

| | | | |
|---|---|---|---|
| 816,012 | 7/1959 | Great Britain | 128/156 |
| 481,823 | 3/1938 | Great Britain | 128/156 |

*Primary Examiner*—Aldrich F. Medbery

[57] ABSTRACT

The specification discloses a surgical or wound dressing of the kind comprising a backing strip one side of which has an adhesive facing and an absorbent pad on said one side of the backing strip, in which dressing a film of elastomeric material of a synthetic or natural rubber alone or compounded with other ingredients overlying the absorbent pad, the film being perforated with deformable pores to allow exudate from a wound to which the dressing is applied to be absorbed by the pad and to permit scab portions to pass freely therethrough.

14 Claims, 1 Drawing Figure

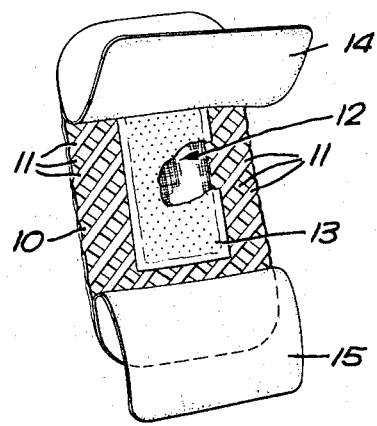

SURGICAL DRESSINGS

BACKGROUND OF THE INVENTION

The invention relates to surgical or wound dressings.

Known art describes dressings in which the absorbent pad is rendered non-adherent to a wound by providing the absorbent pad with an overlying layer of moisture impervious smooth lubricious film of polyethylene, polyethylene terephthalate or other similar material. We have found that this is an insufficient combination to permit rapid healing of the wound. In particular a film of the nature of polyethylene and polyethylene terephthalate are relatively hard in feel and do not readily conform to the surface of the wound. Known soft films of the P.V.C.-type contain plasticisers, stabilisers and other advantitious materials which may give rise to dermatitic or other toxicological conditions.

An object of the invention is to provide an improved surgical or wound dressing which does not adhere to the wound it covers.

SUMMARY OF THE INVENTION

The invention provides a surgical or wound dressing of the kind comprising a backing strip one side of which has an adhesive facing and an absorbent pad provided on said one side of the backing strip, in which dressing there is a film of elastomeric material of synthetic or natural rubber alone or compounded with other ingredients, overlying the absorbent pad, the film being perforated to allow exudate from a wound to which the dressing is applied to be absorbed by the pad.

An advantage found unexpectedly of using a dressing according to the invention is that the film of natural or synthetic rubber has the property of conforming to the shape of the wound while at the same time the dried exudate which forms a scab over the wound does not adhere to the film.

The thickness of the film of elastomeric material is preferably not greater than 0.010 inch and is preferably in the range 0.0005 to 0.003 inch.

The edges of the film may extend beyond the absorbent pad and adhere to the adhesive facing to hold the film in position over the pad.

In some embodiments of the invention, the film may be made of gutta percha or gutta percha compounded with other elastomers and/or fillers.

In other embodiments of the invention the film may be made of polychloroprene or polychloroprene compounded with other elastomers and/or fillers.

In further embodiments of the invention the film may be made of trans-polyisoprene or trans-polyisoprene compounded with other elastomers and/or fillers.

In yet further embodiments of the invention, the natural or synthetic rubber in the film may be compounded with plastics polymers. In such embodiments, the plastics polymer may be polyethylene. Preferably, the polyethylene is compounded with low molecular weight polymers of polyisobutylene.

In any of the above arrangements the film may include additives which promote healing of a wound, for example bacteriocides and bacteriostats.

The diameter of each perforation is preferably substantially 0.5 mm., and there are preferably substantially 100 perforations per square centimetre.

BRIEF DESCRIPTION OF THE DRAWINGS

The drawing shows a partly opened surgical or wound dressing embodying the invention.

DESCRIPTION

The surgical or wound dressing comprising a backing strip 10 having an adhesive facing 11 provided on one side thereof. The strip 10 is preferably of an elastomeric plastic material having ventilation pores provided therethrough, although the strip 10 may be a woven fabric, or a film of plastics material having no ventilation pores. The facing 11 comprises a rubber-based pressure-sensitive adhesive material applied to the backing strip to define a network of adhesive bands.

An absorbent lint pad 12 is provided on said one side of the strip 10, the pad being attached to the strip by means of the adhesive facing 11. The pad preferably comprises a wad of lint, but may comprise a wad of other absorbent material, such as cotton wool, contained in a lint or gauze envelope.

A film 13 of gutta percha tissue overlies the absorbent pad 12, the tissue having a plurality of small perforations provided therein. A preferred diameter for each perforation is 0.5 mm., there being 100 perforations per square cm. The thickness of the film 13 is not greater than 0.010 inch, and preferably in the range 0.0005 to 0.003 inch, to allow the film to conform to the outer surface contour of the wound. The tissue 13 is slightly larger than the pad 12 the edge margins of the tissue 13 extending beyond the pad and adhering to the adhesive facing 11.

The one side of the dressing is covered with two protective leaves, 14, 15, of a plastics material which peels easily from the adhesive facing 11. The central portions of the two leaves overlie one another to provide a tab on one leaf by which the leaf may be gripped to assist removal from the dressing.

In use, the dressing is applied in the usual way for known dressings to a wound. The perforations in the gutta percha tissue allows the exudate from the wound to be absorbed by the pad 12. However, as the exudate dries and a scab is formed on the wound, the gutta percha tissue separates the pad from the scab and prevents the pad from adhering to the scab. In addition, it is found that the gutta percha tissue itself has particularly advantageous non-stick and elastomeric properties, and the tissue itself tends not to adhere to the wound, either before the wound has dried, or to a scab which has formed over the wound and the perforations may stretch and deform to permit scab portions to pass therethrough.

The gutta percha material of film 13 may be compounded with other elastomeric materials, e.g., natural rubber, polychloroprene, styrene butadiene rubbers, butadiene acrylonitrile rubber, butyl rubbers, and/or purified fillers, e.g., calcium carbonate and silicate, to give body to the tissue. The following is an example of a batch of a suitable gutta percha compound from which the film 13 can be made.

| | |
|---|---|
| "A" GUTTA (No 1 PAHANG) WASHED | 5.500 Kilograms |
| FINE BLOCK BALATA (MANAOS) WASHED | 7.500 Kgs. |
| RUBBER - SMR 5 C.V. | 9.000 Kgs. |
| PARAFFIN WAX 140/145° M.P. | 11.000 Kgs. |
| FRENCH CHALK | 14.500 Kgs. |

-Continued

| SULPHUR M C | 0.300 Kgs. |
|---|---|
| | 47.800 Kgs. |

Another preferred elastomeric material for the film 13 is polychloroprene which can also be compounded with other elastomers and/or fillers. The following is an example of a batch of suitable polychloroprene compound from which the film 13 can be made.

| NEOPRENE (Registered Trade Mark) | AD 20 | 5.000 Kgs. |
|---|---|---|
| NEOPRENE | H.C. | 5.000 Kgs. |
| NEOPRENE | F.C. | 1.000 Kgs. |
| RUBBER SMR5 C.V. | | 8.000 Kgs. |
| PARAFFIN WAX 140/145° M.P. | | 10.000 Kgs. |
| FRENCH CHALK | | 15.000 Kgs. |
| STEARIC ACID | | 0.250 Kgs. |
| NONOX EXP | | 0.500 Kgs. |
| TRI-XYLYL PHOSPHATE | | 1.000 Kgs. |

In each of the above two examples, the finished tissue is sterilised by subjecting it to gamma rays.

The film 13 may be made of a synthetic gutta percha material, known as "trans-pip", which is essentially trans-polyisoprene, and may be compounded with other elastomers and/or fillers.

It is also possible to make the film 13 from plastics polymers which are compounded with elastomers to make them elastomeric in character. An example is low density polyethylene compounded with natural rubber, polyisoprene and other synthetic rubbers. Low molecular weight polyisobutylenes are particularly suitable for giving polyethylene an elastomeric quality.

One further advantage of using Gutta-Percha film and materials of a rubber-like nature is the low-processing temperatures used, both in compounding and tissue preparation. This enables other additives to be used in the tissue to promote healing. As examples of materials which may be incorporated are hexachlorophene, sulphamtrazine and other sulphonamides, penicillins and tetracyclines.

A particular advantage of using a dressing according to the invention is that the elastomeric film 13 readily conforms to a wide variety of shapes likely to arise in a wound condition. This gives appreciably enhanced healing rates of wounds to which such a dressing is applied.

I claim:

1. An improved surgical or wound dressing of the kind comprising a backing strip one side of which has an adhesive facing, a resilient absorbent pad on said one side of the backing strip, and a means for contacting and conforming to the wound surface comprising a covering layer overlying the absorbent pad of a readily stretchable film of elastomeric material which has a thickness not greater than 0.010 inch and a means for permitting wound scab and exudate from a wound to which the dressing is applied to be readily passed there through comprising deformable spaced perforations in said elastomeric covering material layer.

2. A dressing as claimed in claim 1 wherein the thickness of the film is in the range 0.0005 to 0.003 inch.

3. A dressing as claimed in claim 1 wherein the edges of the film extend beyond the absorbent pad and adhere to the adhesive facing to hold the film in position over the pad.

4. A dressing as claimed in claim 1 wherein the film is made of gutta percha or gutta percha like material.

5. A dressing as claimed in claim 1 wherein the film is made of polychloroprene or polychloroprene compounded with other elastomers and/or fillers.

6. A dressing as claimed in claim 1 wherein the film is made of trans-polyisoprene or trans-polyisoprene compounded with other elastomers and/or fillers.

7. A dressing as claimed in claim 1 wherein the natural or synthetic rubber in the film is compounded with plastics polymers.

8. A dressing as claimed in claim 7 wherein the plastics polymer is polyethylene.

9. A dressing as claimed in claim 8 wherein the polyethylene is compounded with low molecular weight polymers of polyisobutylene.

10. A dressing as claimed in claim 1 wherein the film includes additives which promote healing of a wound.

11. A dressing as claimed in claim 1 wherein the diameter of each perforation in the film is substantially 0.5 mm. and there are substantially 100 perforations per square centimetre.

12. A dressing as claimed in claim 1 wherein the elastomeric material is natural or synthetic rubber.

13. A dressing as claimed in claim 12 wherein the rubber is compounded with other ingredients.

14. A dressing as claimed in claim 4 wherein the gutta percha or gutta percha like material is compounded with other elastomers and/or fillers.

* * * * *